United States Patent [19]

Lordi

[11] Patent Number: 4,496,681
[45] Date of Patent: Jan. 29, 1985

[54] FIRE RETARDANT CONCENTRATE
[75] Inventor: Frank E. Lordi, West Chester, Pa.
[73] Assignee: Atlantic Richfield Company, Los Angeles, Calif.
[21] Appl. No.: 221,858
[22] Filed: Dec. 31, 1980
[51] Int. Cl.³ ............................................... C08K 5/06
[52] U.S. Cl. .................................................... 524/371
[58] Field of Search ................. 260/45.95 G, 45.75 G, 260/45.7 RL; 524/373, 371

[56] References Cited

U.S. PATENT DOCUMENTS

| 3,796,772 | 3/1974 | Luce | 260/45.95 G |
|---|---|---|---|
| 3,997,505 | 12/1976 | Albright | 260/45.8 R |
| 4,032,508 | 1/1977 | Anderson | 260/45.95 G |
| 4,059,545 | 11/1977 | Corbett et al. | 260/45.7 RL |
| 4,097,550 | 6/1978 | Haaf et al. | 525/71 |
| 4,136,135 | 1/1979 | Lee | 260/45.7 RL |
| 4,191,685 | 3/1980 | Haaf et al. | 260/45.95 G |

Primary Examiner—Veronica P. Hoke

[57] ABSTRACT

Pellets of a concentrated composition suitable for blending with pellets of styrene-maleic anhydride resins in an extruder are prepared by dispersing an ether having two brominated phenyl groups and a lesser amount of antimony trioxide in a radial block copolymer of about 50% to about 80% vinyl aromatic compound and about 20 to 50% alkadiene, there being from about 10 to about 25% antimony trioxide, from about 30 to about 45% brominated phenyl ether having two brominated phenyl groups and from about 45% to about 55% radial block copolymer, said concentrated composition containing from about 0.05% to about 5% modifiers comprising an antioxidant phenol having sterically hindering alkyl substituents.

2 Claims, No Drawings

FIRE RETARDANT CONCENTRATE

FIELD OF INVENTION

This invention relates to the fireproofing of resins featuring interpolymers comprising styrene and maleic anhydride, sometimes called styrene-maleic anhydride resins.

PRIOR ART

Lee U.S. Pat. No. 4,151,218 describes fire retardant compositions comprising brominated diphenyl ethers, antimony oxide and magnesium carbonate.

Brominated diphenyl ether and metal oxides are recommended as fire retardants in U. S. Pat. No. 3,075,944.

Di Giulio et al, Ser. No. 147,666, filed May 7, 1980, U.S. Pat. No. 4,278,768 describes steam expanded foams containing the combination of brominated diphenyl ether and antimony oxide as a fire retardant for a rubber modified styrene-maleic anhydride resin.

SUMMARY OF THE INVENTION

In accordance with the present invention, pellets of a concentrated composition suitable for blending with pellets of styrene-maleic anhydride resins in an extruder are prepared by dispersing an ether featuring two brominated phenyl groups and a lesser amount of antimony trioxide in a radial block copolymer of about 50% to about 80% vinyl aromatic compound and about 20 to 50% alkadiene, there being from about 10 to about 25% antimony trioxide, from about 30 to about 45% brominated ether, and from about 45% to about 55% radial block copolymer, said concentrated composition containing from about 0.05% to about 5% modifiers comprising an anti-oxident phenol having sterically hindering alkyl substituents.

The nature of the invention is further clarified by reference to a plurality of examples.

EXAMPLE I

Automobiles make use of laminates featuring an underlying foam layer and a surface sheet laminated to such foam layer. In a series of control preparations, a laminate consisted of an intermediate foam layer and a pair of wear resistant surface sheets. These were prepared for evaluation for potential use as a portion of a headliner for the interior of an automobile. Such laminates must provide appropriate cushioning to decrease the liklihood of injury in the event of accident, and must be tough enough to be as durable as other portions of the auto interior. For safety reasons, such laminates should not burn rapidly, although some similar types of film coated foam have a high flame speed greater than 12 inches per minute. In one control, a laminated sandwich of foam and sheets of extruded styrene-maleic anhydride plastic, was evaluated by a federal specifications test designated as MVSS-302, Motor Vehicle Safety Standard No. 302 for measuring the flammability of materials employed in the interior of vehicles. Briefly, the test measures the flame speed through the middle 11 inches of a horizontally positioned 14 inch strip of the laminate. Even after flame speeds are determined for the foam layer and for the decorative sheet, there is need for measuring the flame speed for the composite, inasmuch as any bonding, (if any) affects flammability. The compositie is subjected to a flammability test. A sandwich comprising a foamed styrene-maleic anhydride core and two 8 mil sheets of styrene-maleic anhydride plastic had a burning rate of about 4.5 minutes, and was the control for evaluting fire retardancy.

An ether comprising two brominated phenyl groups, such as $(Br_5C_6)OCH_2CH_2O(C_6Br_5)$ [i.e. 1, 2-bis (2', 3', 4', 5', 6', pentabromophenoxy) ethane]or $C_6H_2Br_3OC_6H_2Br_3$ [i.e. bis (tribromophenyl) ether]is an effective flame retardant, especially when combined with antimony trioxide, and this combination has been found useful in styrene-maleic anhydride styrene-maleic anhydride type resins.

Inherent properties of 1, 2-bis (2', 3', 4', 5', 6', pentabromophenoxy) ethane and bis (tribromophenyl) ether include bromide contributing most of the molecular weight of the ether, such ether having not more than 14 carbon atoms. Because many articles are made without flame retardants, a molder benefits by having a supply of pellets of a concentrated flame retardant composition which can be blended in appropriate amounts with conventional pellets to provide sources of suitable molding compositions meeting various standards of fire retardancy. The resin employed for the concentrate must have the ability to blend readily with the styrene-maleic anhydride resin in an extruder. It is important that the relatively high concentrations of both the brominated ether and the antimony trioxide be uniformly dispersed in the extrudate. Radial block copolymers containing 50 to 80% styrene and 50 to 20% alkadiene are suitable resins for the concentrate. One brand of a high impact polystyrene block copolymer is marketed by Phillips Petroleum Co. as K-Resin KR-03.

A concentrated composition was prepared consisting of:

|  | Pts. By Wt. |
| --- | --- |
| Phillips KR-O3 High Impact Polystyrene | 52 |
| Pyrochek 77B bis (pentabromophenyl) ether of ethylene glycol | 36 |
| Antimony Trioxide | 12 |
| Modifiers | 0.1 |
| Irganox 1076 Sterically Phenol |  |

Such concentrate was formed into pellets. Such pellets were mixed with 5.83 parts of styrene-maleic anhydride pellets per part of pellets of such concentrate to provide a blended composition consisting of 80% styrene, 7% maleic anhydride, 13% rubber, 7.6% KR-03, 5.3% ether comprising two brominated phenyl ether groups and 1.8% antimony trioxide. Sheets were extruded from such blend, and a foam core sandwiched laminate was prepared using such sheets as the two facing layers. The laminates featuring such composition had a burning rate of 0.6 inches per minute, even though the fireproofed laminates differed from the controls only in the presence or absence of 15% pellets of the concentrate in the blend for extruding the surface sheets. Such reduction of flame speed from 4.5 inches per minute for the previously discussed control to 0.6 inches per minute was deemed outstandingly effective.

By a series of tests it was established that the flame retardant concentrate should consist of from about 45% to about 55% of KR-03 or equivalent radial block copolymer having about 50% to about 80% monovinyl aromatic compound and about 50% to about 20% alkadiene; from about 30% to about 45% ether having two brominated phenyl groups; from about 10 to about 25% antimony trioxide; and from about 0.05 to about 5% modifiers comprising about 0.05 to about 0.15% antioxidant phenol having sterically hindering alkyl substituents.

Alkadiene is an art-recognized term designating a linear conjugated diene (e.g. isoprene, piperlylene, or butadiene) suitable for polymerization to a strong elastomer.

Various modifications of the invention are possible without departing from the scope of the appended claims.

The invention claimed is:

1. A fire retardant concentrate consisting essentially of the combination of:
   about 45% to about 55% of a radial block copolymeric resin having about 50 to about 80% styrene and about 50 to about 20% alkadiene,
   about 30% to about 45% ether having two brominated phenyl groups said ether being selected from the group consisting of brominated phenyl ether and 1, 2, bisphenoxy ethane having two brominated phenyl groups,
   about 10 to about 25% antimony trioxide, and about 0.05 to about 5% modifiers comprising about 0.05 to about 0.15% antioxidant phenol having stericlly hindering alkyl substituents, said concentrate being pelleted, said pellets of concentrate being blendable with pellets of styrene-maleic anhydride copolymeric resin to provide blends having a slower burning rate than products made from said styrene-maleic anhydride pellets.

2. The fire retardant composition of claim 1, in which the ether is selected from the group consisting of bis (tribromophenyl) ether and 1, 2 bis (2', 3', 4', 5', 6', pentabromophenoxy) ethane.

* * * * *